Dec. 3, 1935.   M. C. HAMMOCK   2,023,049
UNIVERSAL HARROW AND CULTIVATOR
Filed Aug. 10, 1935   2 Sheets-Sheet 1
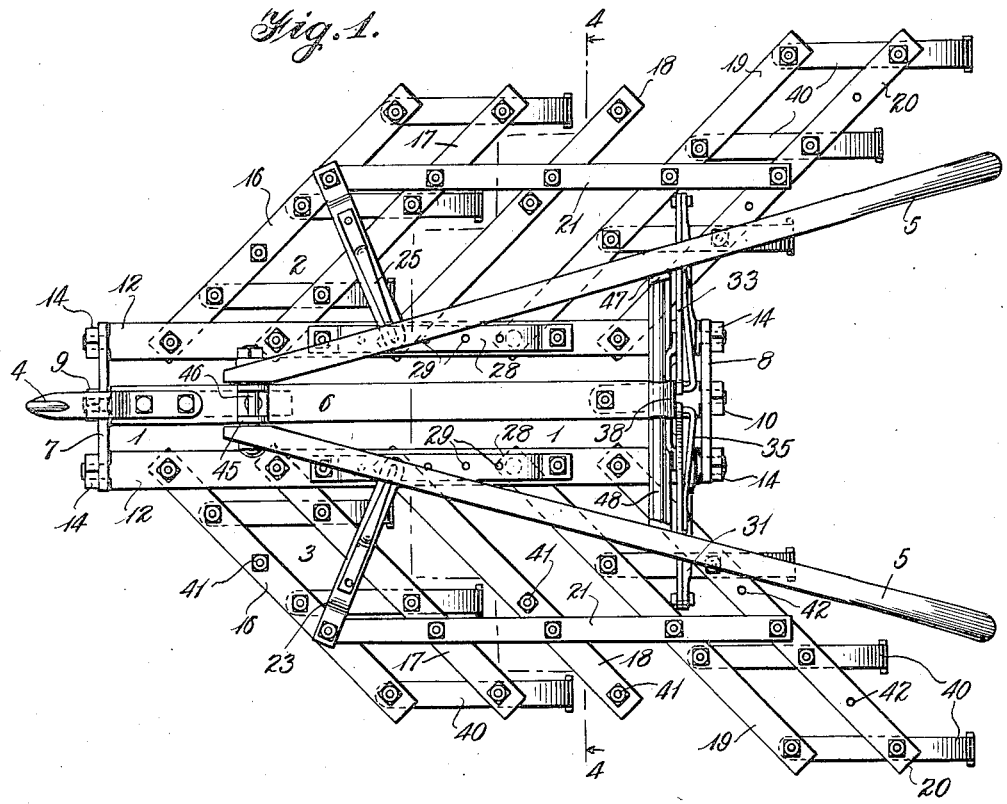
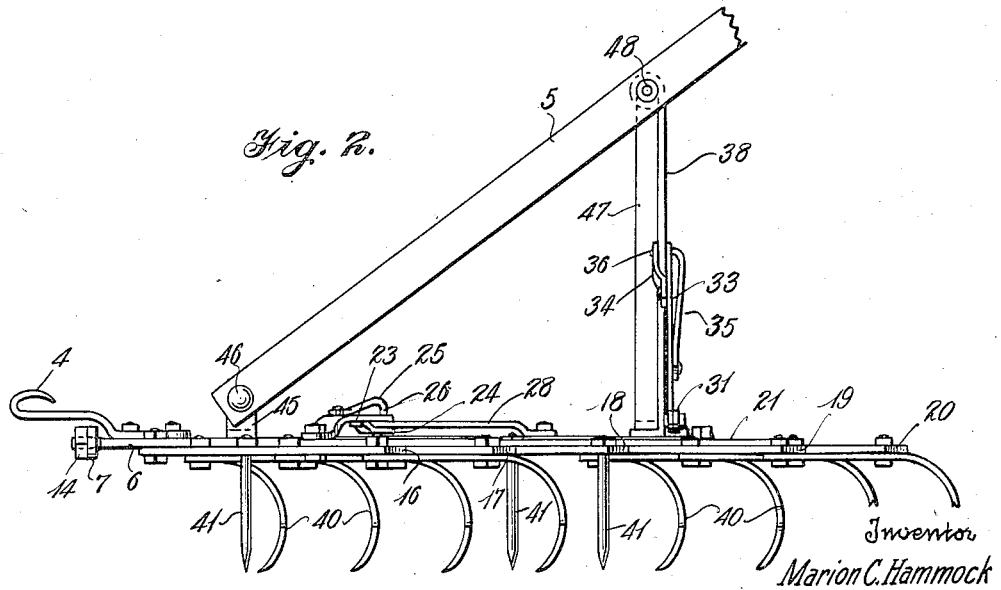

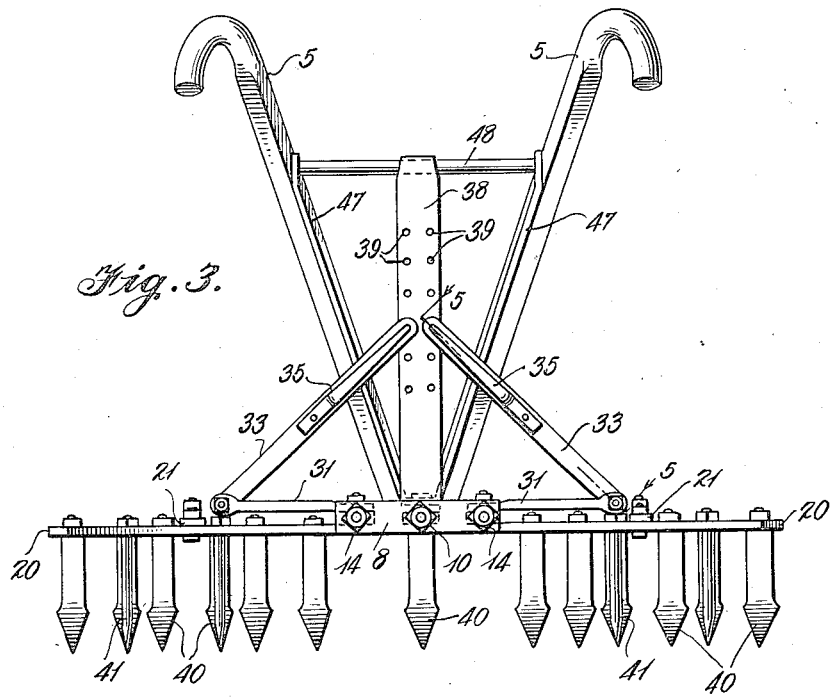
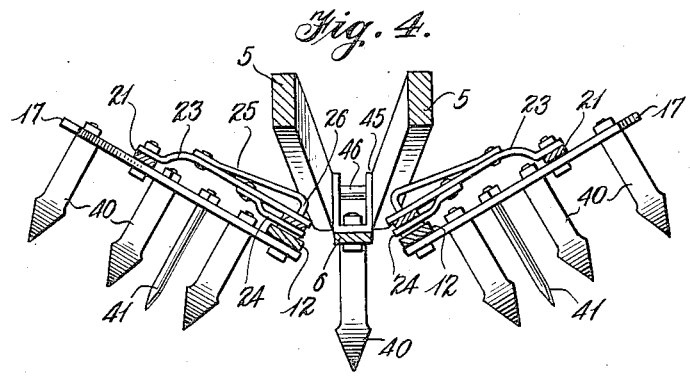
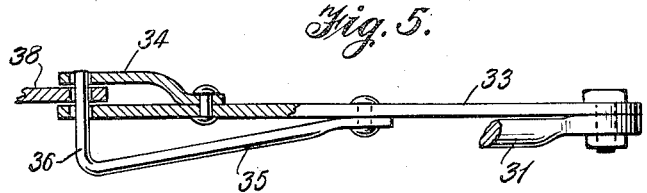

Patented Dec. 3, 1935

2,023,049

UNITED STATES PATENT OFFICE 2,023,049

UNIVERSAL HARROW AND CULTIVATOR

Marion C. Hammock, Crystal Springs, Miss.

Application August 10, 1935, Serial No. 35,651

7 Claims. (Cl. 55—150)

This invention relates to a universal harrow and cultivator.

It is the object of the invention to provide a rugged farm implement formed by a metallic framework having straight and spring teeth set therein for the purpose of working the soil. This implement embodies adjustable wings for permitting a variation of the spread as well as the tilt or inclination of the wings to suit any conditions which may be encountered in the course of harrowing or cultivating the soil. The wings are assembled in conjunction with a central frame so that the wings are easily and quickly adjustable without the need of any tools and when once adjusted in position are securely held therein despite any shocks, jars, vibrations or obstacles which may be encountered.

It is a further object of the invention to provide yielding clamps for holding the wings in their adjusted positions with the desired tilt and spread imparted to them; these clamps are simple in construction and are capable of easy and quick manipulation. In accordance with the instant invention it is possible to handle the four clamps provided herein to adjust the spread and tilt of both wings within a minute's time.

Other objects and purposes will appear from a detailed description of the invention hereinafter, taken in conjunction with the accompanying drawings wherein:

Fig. 1 is a plan view of my improved harrow and cultivator,

Fig. 2 is a front elevation of Fig. 1,

Fig. 3 is a right side elevation of Fig. 1,

Fig. 4 is a sectional view along line 4—4 of Fig. 1, and

Fig. 5 is a sectional view along line 5—5 of Fig. 3.

In Fig. 1, my improved harrow and cultivator consists essentially of a central frame 1 having mounted thereon the adjustable wings 2 and 3, the draft hook 4 at the front thereof and the rearwardly extending guiding handles 5. The central frame is formed by a longtiudinal bar 6 and transverse bars 7 and 8 forced on to the opposite ends of bar 6 and securely held in place by bolts 9 and 10, respectively.

Circular openings are provided adjacent the ends of transverse bars 7 and 8. Longitudinal bars 12 forming part of the wings 2 and 3, are journalled adjacent their ends for rotating within the aligned openings in the respective bars 7 and 8 and are threaded at their ends for retention in place by the nuts 14.

A plurality of transverse bars extend from each of the longitudinal bars 12 but since each wing is symmetrical with respect to the other and similar in all respects, the detailed explanation will be confined to only one of these. The transverse bars 16, 17, 18, 19 and 20 are pivotally connected to the longitudinal bar 12 at spaced points of the latter. An additional bar 21, parallel to bar 12, is also jointedly connected to the plurality of transverse bars. By adjusting the angular disposition of the transverse bars with respect to the longitudinal axis of the central frame it is possible to control the spread of the wings to adapt them to cover a path or furrow of any desired width, ranging from 20 inches to 48 inches in the illustrated embodiment.

In order to retain the transverse bars fixed in their adjusted positions after the desired spread has been imparted to them, one end of a bar 23 is connected to the foremost transverse bar 16 at the junction thereof with bar 21 by means of a bolt and nut. The bar 23 is slightly offset to permit the riveting of the flattened end of a cylindrical spring rod 25 to one side thereof and a short supplemental bar 24 to the other side thereof near its free end. The supplemental bar 24 is parallel to bar 23 and is displaced therefrom an extent sufficient to embrace a bar 28 mounted upon the longitudinal bar 12, and having apertures 29 therein. Aligned apertures are also provided at the free ends of bars 23 and 24 through which normally extends the portion 26 of rod 25. The portion 26 of the rod 25 may be yieldingly retracted to permit the selective alignment of the apertures 29 with the apertures in bars 23 and 24 whereupon the portion 26 of rod 25 springs back into place and maintains the fixed relationship between the transverse bars and bar 12 which is effected by the adjustment.

A similar clamping device as that explained above is used for holding the wings in the desired inclined or tilted positions, (Figs. 3, 5). One end of a rod 31 is bolted to the rear end of each longitudinal bar 12 and extends laterally therefrom for a short distance. The bar 33 is pivotally connected to the free end of rod 31. The supplemental bar 34 and spring rod 35 are riveted to bar 33, and the portion 36 of the spring rod extends within aligned opening in the ends of bars 33 and 34. The upstanding plate 38 having the rows of apertures 39 therein is rigidly mounted upon the frame 1 at the rear thereof, and the selective engagement of the apertures 39 with the spring rod portion 36 at the point of plate 38 embraced by the fork formed by the ends of 33 and 34 determines the individual tilt of each wing. The degree of tilt or inclination may be varied in conformity with the outline of the terrain operated upon, and the wings may be raised or lowered as desired.

The individual spring teeth 40 upon the wings are each detachably connected to pairs of the transverse bars forming the wings. In the illustrated embodiment, three spring teeth 40 are attached by means of bolts and nuts to the transverse bars 16 and 17 of each wing. Three more are attached to the transverse bars 19 and 20 in staggered relation with respect to the first three so that the working of the soil is covered thoroughly. Two spring teeth are attached to the underside of bar 6, one behind the other. Two straight teeth 41 are attached to each transverse bar 18 and one tooth to each transverse bar 16. Therefore, in the illustrated construction, there are fourteen spring teeth and six straight teeth to effect a working of the soil. Openings 42 may be provided in one or more of the transverse bars for the mounting of additional teeth or for varying their positions. The several teeth may be detached easily for sharpening or for altering their arrangement.

The handles 5 are connected at their forward ends to a bracket 45, fixed to bar 6, by means of a bolt 46. A brace 47 for the handles extends upwardly from bar 6 at the rear of the central frame 1, and is spanned by the long horizontal rod 48, to the middle of which is connected the plate 38 and the ends of which tie together the handles and the brace by means of nuts.

An extremely rugged and efficient construction results from the design described above, which is all metal with the exception of the handles. However, it is to be understood that the invention is not limited to the specific details shown, but is to be construed only in the light of the appended claims.

What I claim is:

1. In a farm implement of the class described, a central frame comprising a longitudinal bar and a transverse bar connected thereto at each end thereof, said opposing transverse bars having aligned openings adjacent the ends thereof; a wing disposed upon each side of said longitudinal bar and capable of pivotal movement with respect thereto, each of said wings including a longitudinal bar having the ends thereof rotatably mounted in the aligned openings of the respective transverse bars; adjustable holding means extending between each of said wings and said central frame for retaining each of said wings in its adjusted pivoted position; a plurality of transverse bars pivotally attached to each longitudinal bar of said wings permitting the spread of each wing to be adjusted; adjustable holding means on each wing for retaining said wings in adjusted position; and a plurality of teeth extending downwardly from the bottom of said farm implement.

2. In a farm implement of the class described, a central frame comprising a longitudinal bar and a transverse bar connected thereto at each end thereof, said opposing transverse bars having aligned openings adjacent the ends thereof; a wing disposed upon each side of said longitudinal bar and capable of pivotal movement with respect thereto, each of said wings including a longitudinal bar having the ends thereof rotatably mounted in the aligned openings of the respective transverse bars; a plate member extending upwardly from said frame, a plurality of apertures in said plate member; yieldable holding means attached to each of said wings and selectively engaging said apertures for retaining each of said wings in its adjusted pivoted position; a plurality of transverse bars pivotally attached to each longitudinal bar of said wings, an additional bar extending in parallel to said each longitudinal bar and jointedly connected to said transverse bars whereby an adjustment of the spread of each wing may be made; adjustable holding means on each wing for retaining said wings in adjusted spread position; and a plurality of teeth extending downwardly from the bottom of said farm implement.

3. The combination claimed in claim 2 wherein said adjustable holding means on each wing for retaining said wings in adjusted spread position comprises a bar having a series of apertures therein mounted upon said longitudinal bar of each wing, and holding means pivotally attached at one end thereof to one of said transverse bars at a point displaced from said longitudinal bar having yieldable means at the other end thereof selectively engaging the apertures in said first-mentioned bar.

4. The combination claimed in claim 1 wherein said plurality of teeth extending downwardly from the bottom of the farm implement is composed of a plurality of spring teeth, each individual spring tooth on said wings adapted to be connected to pairs of said transverse bars.

5. The combination claimed in claim 1 wherein said plurality of teeth extending downwardly from the bottom of the farm implement is composed of a plurality of spring teeth in offset relationship, each individual spring tooth on said wings adapted to be connected to pairs of said transverse bars, and the spring teeth on said longitudinal bar of said central frame in alignment with each other.

6. The combination claimed in claim 1 wherein said plurality of teeth extending downwardly from the bottom of the farm implement is composed of a plurality of spring teeth, each individual spring tooth on said wings adapted to be detachably connected to pairs of said transverse bars, and straight teeth on said wings adapted to be detachably connected thereto, said transverse bars having additional openings therein for varying the placement of said teeth.

7. The combination claimed in claim 2 wherein said yieldable holding means engaging the apertures in said plate member includes a rigid bar, a short supplemental bar attached to said first-mentioned bar and extending in parallel thereto to the end thereof and displaced therefrom an extent permitting the engagement of said plate member therebetween, said rigid bar and supplemental bar having aligned apertures therein, and a spring rod connected to said rigid bar having a portion thereof extending within said aligned apertures and another portion angularly disposed with respect to said first portion permitting the yielding withdrawal of said first portion the amount of said displacement between said rigid and supplemental bars.

MARION C. HAMMOCK.